(12) United States Patent
Engler et al.

(10) Patent No.: US 8,762,731 B2
(45) Date of Patent: Jun. 24, 2014

(54) MULTI-SYSTEM SECURITY INTEGRATION

(75) Inventors: Michael Engler, Walldorf (DE);
Martijn De Boer, Heidelberg (DE);
Wolfgang Janzen, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/617,962

(22) Filed: Sep. 14, 2012

(65) Prior Publication Data
US 2014/0082366 A1    Mar. 20, 2014

(51) Int. Cl.
*G06F 21/50*    (2013.01)
(52) U.S. Cl.
USPC .............................................. 713/176; 726/22
(58) Field of Classification Search
USPC ........................................ 713/176; 726/26, 22
See application file for complete search history.

(56) References Cited

U.S. PATENT DOCUMENTS

| 2010/0100927 | A1* | 4/2010 | Bhola et al. ...................... 726/1 |
| 2011/0131416 | A1* | 6/2011 | Schneider ...................... 713/172 |
| 2011/0258704 | A1* | 10/2011 | Ichnowski ...................... 726/26 |
| 2012/0054846 | A1* | 3/2012 | Lightsey ............................ 726/9 |
| 2013/0160132 | A1* | 6/2013 | Genova et al. .................. 726/26 |

OTHER PUBLICATIONS

Barth, et al, "Robust Defenses for Cross-Site Request Forgery", CCS 2008, Oct. 2008, 13 pages.

* cited by examiner

*Primary Examiner* — Matthew Smithers
(74) *Attorney, Agent, or Firm* — Brake Hughes Bellermann LLP

(57) ABSTRACT

In accordance with aspects of the disclosure, a system and methods are provided for managing multi-system security integration by performing state change calls to one or more backend systems by combining a multi-system protection token with a message component for transporting from a user agent to the one or more backend systems for validation by generating an authentication code for proving authenticity of a combined data structure generated by combining a secret cryptographic data key with a portion of the message component and generating a hash code of the combined data structure, generating an arbitrary random number to bind the multi-system protection token to the user agent, and generating the multi-system protection token by combining the authentication code and the arbitrary random number with the message component for transporting from the user agent to the one or more backend systems for validation.

25 Claims, 6 Drawing Sheets

MULTI-SYSTEM SECURITY INTEGRATION

TECHNICAL FIELD

The present description relates to computer-based techniques for multi-system security integration.

BACKGROUND

Generally, cross-site request forgery (CSRF or XSRF), which may be referred to as session riding, refers to a malicious related attack of a target system, such as, for example, a client system (including user messaging services) and/or a network based site, whereby unauthorized commands could be transmitted from a user that the website trusts. For example, XSRF may attempt to exploit trust that a site has in a user's browser. Sometimes, XSRF vulnerabilities can be easily exploited. In some cases, XSRF attacks include a link or script in a page that accesses a previously authenticated site for a user. In some other cases, the attack does not need to originate from a site. For example, the attacker could send an email to a user in an attempt to deceive the user into selecting a link in the email to generate a browser window and execute the attack. As such, there exists a need to improve security in some systems including systems that attempt to use XSRF protection.

SUMMARY

In accordance with aspects of the disclosure, a computer system may be provided including instructions recorded on a computer-readable medium and executable by at least one processor. The computer system may include a multi-system manager configured to cause the at least one processor to perform state change calls to one or more backend systems by combining a multi-system protection token with a message component (e.g., a uniform resource locator (URL) or a message body) for transporting from a user agent to the one or more backend systems for validation. The multi-system manager may include a symbol generator configured to generate an authentication code for proving authenticity of a combined data structure generated by combining a secret cryptographic data key with a portion of the message component (e.g., one or more concatenated data fields of the uniform resource locator (URL) or part of the message body) and generating a hash code of the combined data structure. The multi-system manager may include a nonce generator configured to generate an arbitrary random number to bind the multi-system protection token to the user agent. The multi-system manager may include a token generator configured to generate the multi-system protection token by combining the authentication code and the arbitrary random number with the message component for transporting from the user agent to the one or more backend systems for validation.

In accordance with aspects of the disclosure, a computer-implemented method may be provided for performing state change calls to one or more backend systems by combining a multi-system protection token with a message component (e.g., a uniform resource locator (URL) or a message body) for transporting from a user agent to the one or more backend systems for validation by generating an authentication code for proving authenticity of a combined data structure generated by combining a secret cryptographic data key with a portion of the message component (e.g., one or more concatenated data fields of the uniform resource locator (URL) or part of the message body) and generating a hash code of the combined data structure, generating an arbitrary random number to bind the multi-system protection token to the user agent, and generating the multi-system protection token by combining the authentication code and the arbitrary random number with the message component for transporting from the user agent to the one or more backend systems for validation.

In accordance with aspects of the disclosure, a computer program product may be provided, wherein the computer program product is tangibly embodied on a computer-readable storage medium and includes instructions that, when executed by at least one processor, may be configured to perform state change calls to one or more backend systems by combining a multi-system protection token with a message component (e.g., a uniform resource locator (URL) or a message body) for transporting from a user agent to the one or more backend systems for validation. The instructions, when executed by the at least one processor, may be further configured to generate an authentication code for proving authenticity of a combined data structure generated by combining a secret cryptographic data key with a portion of the message component (e.g., one or more concatenated data fields of the uniform resource locator (URL) or part of the message body) and generating a hash code of the combined data structure, generate an arbitrary random number to bind the multi-system protection token to the user agent, and generate the multi-system protection token by combining the authentication code and the arbitrary random number with the message component for transporting from the user agent to the one or more backend systems for validation.

The details of one or more implementations are set forth in the accompanying drawings and the description below. Other features will be apparent from the description and drawings, and from the claims.

DETAILED DESCRIPTION

Figure 1:
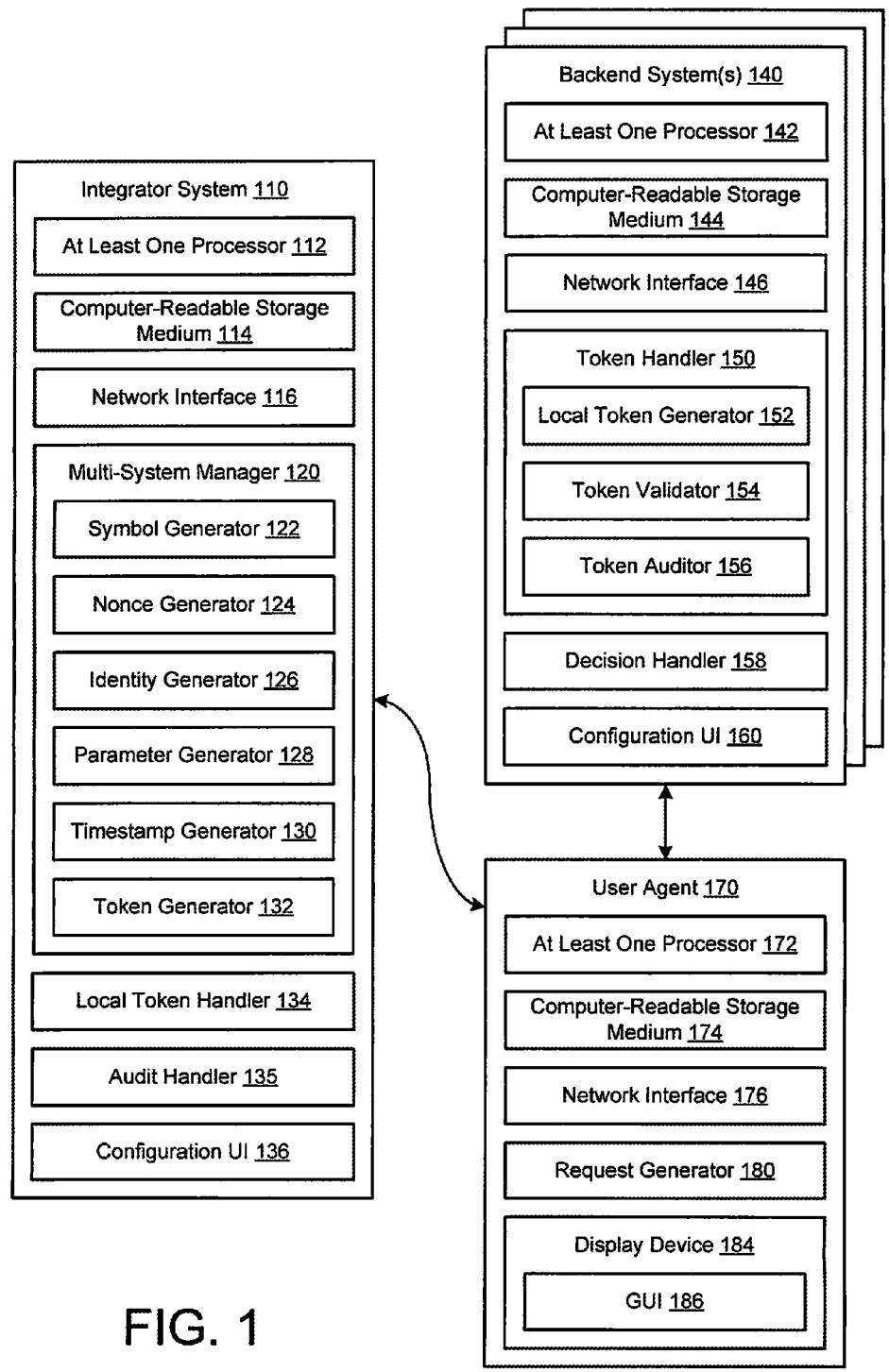
FIG. 1 is a block diagram illustrating an example system for managing multi-system security integration, in accordance with aspects of the disclosure.

FIG. 1 is a block diagram illustrating an example system 100 for managing multi-system security integration, in accordance with aspects of the disclosure.

In the example of FIG. 1, the system 100 comprises a computing system configured for implementing multi-system security integration management that may be associated with a computer system comprising any type of computer-implemented system configured to integrate different other systems including, for example, an integrator system 110. For instance, in various implementations, the integrator system 110 may be configured to operate as any type of computer-implemented system configured to integrate different other systems including, for example, an enterprise portal server or a multi-system portal server to thereby transform the integrator system 110 into a special purpose machine designed to determine and implement multi-system security integration process(es), including multi-system cross-site request forgery (XSRF) protection, in a manner as described herein. In this sense, it may be appreciated that the integrator system 110 may include any standard element(s) and/or component(s), including at least one processor(s) 112, memory (e.g., non-transitory computer-readable storage medium) 114, a network interface 116, power, peripherals, and various other computing elements and/or components that may not be specifically shown in FIG. 1. In an implementation, the integrator system 110 may include a display device (e.g., a monitor or other display) that may be used to provide a graphical user interface (GUI) that may be used, for example, to receive preferences from an administrator for managing or utilizing the integrator system 110. In various other implementations, the integrator system 110 may be configured to use application server technology to render a user interface (UI) to any user agent and/or any of a plurality of user agents including the user agent 170 that may access the UI (e.g., after authentication and with sufficient authorization). As such, it should be appreciated that various other elements and/or components of the integrator system 110 that may be useful to implement the integrator system 110 or some variation thereof may be added or included, as would be apparent to one of ordinary skill in the art.

In an implementation, the integrator system 110 may include the network interface 116 adapted for communication with a network. In various examples, the network interface 116 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network. In various other examples, the network interface 116 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network.

In various implementations, the network may be implemented as a single network or a combination of multiple networks. For example, the network may include a wireless telecommunications network (e.g., mobile network) adapted for communication with one or more other communication networks, such as the Internet. In other examples, the network may include the Internet, one or more intranets, landline networks, wireless networks, and/or one or more other appropriate types of communication networks. As such, in various implementations, the integrator system 110, the one or more backend systems 140, and the user agent 170 may be associated with a particular link (e.g., a link, such as a URL (Uniform Resource Locator) to an IP (Internet Protocol) address).

Referring to the example of FIG. 1, the integrator system 110 may include a multi-system manager 120 configured to cause the at least one processor 112 to perform state change calls to one or more backend systems 140 by combining a multi-system protection token with a message component (e.g., a uniform resource locator (URL) or a message body, such as a hypertext transfer protocol (HTTP) body) for transporting from a user agent 170 (e.g., a browser) to the one or more backend systems 140 for validation. In an implementation, the integrator system 110 may be configured to operate, for example, as an enterprise portal server, and at least one of the one or more backend systems 140 may be configured to operate and function, for example, as an advanced business application programming (ABAP) backend server to achieve multi-system XSRF protection when the user agent 170 attempts to perform state change calls. However, in various implementations, it should be appreciated by those skilled in the art that the integrator system 110 and the one or more backend systems 140 may comprise any type of computer-implemented system including various types of servers configured to function and operate in a manner consistent with aspects of the disclosure.

The multi-system manager 120 may include a symbol generator 122 configured to generate an authentication code for proving authenticity of a combined data structure generated by combining a secret cryptographic data key with a portion of the message component (e.g., one or more concatenated data fields of the URL or the message body) and generating a hash code of the combined data structure. In an implementation, the symbol generator 122 may comprise an authentication code generator, such as, for example, a hashed message authentication code (HMAC) generator, and the authentication code may comprise a symmetric code, such as, for example, a hashed message authentication code (HMAC), or an asymmetric code, such as, for example a digital signature (e.g., a public/private key pair). The authentication code (e.g., digital signature or HMAC) may be used to achieve integrity and authenticity of a token. The authentication code may be used to verify one or more properties (e.g., integrity and/or authenticity) that may be achieved by some other means, such as, for example, X.509 digital signatures using asymmetric cryptography. In various examples, the term secret may refer to symmetric keys used by HMAC, which may include, but not limited to public/private key pairs. In an example, the secret cryptographic data key may include a digital signature including a public/private key pair.

As such, in an implementation, the HMAC refers to a mechanism to obtain authenticity and integrity of the multi-system protection token, which refers to two security properties that are desirable for protection. It should be appreciated by those skilled in the art that one or more other mechanisms besides HMAC may be used. For instance, a digital signature may be implemented by using asymmetric cryptography instead of the symmetric cryptography used for HMAC.

The multi-system manager 120 may include a nonce generator 124 configured to generate an arbitrary random number (RN) to bind the multi-system protection token to the user agent 170. In an implementation, the nonce generator 124 may comprise a random number (RN) generator configured to generate the arbitrary random number (RN) to bind the multi-system protection token to the user agent 170.

The multi-system manager 120 may include a token generator 132 configured to generate the multi-system protection token by combining the authentication code and the arbitrary random number with the message component (e.g., the URL or HTTP body) for transporting from the user agent 170 to the one or more backend systems 140 for validation. In an implementation, combining the multi-system protection token with the message component (e.g., the URL or HTTP body) may include inserting the multi-system protection token as part of the message component (e.g., the URL or HTTP body) for transporting from the user agent 170 to the one or more backend systems 140 for validation. In an implementation, local protection may be configured to stay in place and may not be deactivated for any time period. However, in another implementation, if a request is received with a valid multi-system XSRF token instead of a local XSRF token, this request may pass the validation and may not be rejected.

The multi-system manager 120 may further include an identity generator 126 configured to generate an integrator identifier (ID), such as, for example, a system identifier (SID), for the integrator system 110 to ensure that the secret cryptographic data key (e.g., a public/private key pair) is known only by the integrator system 110 and the one or more backend systems 140. In an implementation, the token generator 132 may be further configured to generate the multi-system protection token by combining the integrator ID, the authentication code, and the arbitrary random number (RN) with the message component (e.g., the URL or HTTP body).

The multi-system manager 120 may further include a parameter generator 128 configured to generate parameter information comprising one or more hypertext transfer protocol (HTTP) codes associated with the URL including one or more relevant request parameters, such as for example, one or more of an OK code, a GET code, and a POST code. In an implementation, the token generator 132 may be further configured to generate the multi-system protection token by combining the parameter information, the authentication code, and the arbitrary random number (RN) with the URL.

The multi-system manager 120 may further include a timestamp generator 130 configured to generate an expiration timestamp that is valid only during a short time interval including within a range of greater than zero minutes and less than five minutes (e.g., 2 minutes). In an example, the expiration timestamp may comprise an expiration universal time coordinated (UTC) timestamp. In an implementation, the token generator 132 may be further configured to generate the multi-system protection token by combining the expiration timestamp, the authentication code, and the arbitrary random number (RN) with the URL.

As such, in an implementation, the token generator 132 may be configured to generate the multi-system protection token by combining one or more of the authentication code, the arbitrary RN, the integrator ID, the parameter information, and the expiration timestamp with the URL. In another implementation, the token generator 132 may be configured to generate the multi-system protection token by combining each of the authentication code, the arbitrary RN, the integrator ID, the parameter information, and the expiration timestamp with the URL.

In an implementation, the computer-readable storage medium 114 may be configured for storing the secret cryptographic data key in a secure manner, and at least one processor 112 may be configured for retrieving the stored secret cryptographic data key from the computer-readable storage medium 114 for generating the authentication code by the symbol generator 122. In an example, the secret cryptographic data key may include a digital signature including a public/private key pair.

In an implementation, the integrator system 110 may include a local token handler 134 for receiving, processing, and validating one or more XSRF protection tokens created by one of the backend systems 140 and passed via the user agent 170. For instance, a local XSRF protection mechanism of the integrator system 110, operating as a multi-system server, may be configured to achieve the functionality of local XSRF protection. Generally, cross-site request forgery (CSRF or XSRF) is a type of malicious exploit of a website whereby unauthorized commands may be transmitted from a user that the website trusts. Unlike cross-site scripting (XSS), which exploits the trust a user has for a particular site, XSRF exploits the trust that a site has in a browser of the user agent 170. As such, aspects of the disclosure are configured to provide XSRF protection in a manner as described herein.

In an implementation, the integrator system 110 may include an audit handler 135 for auditing support at the portal. The audit handler 135 may be configured to audit each token creation event in conjunction with each parameter that went into the token (e.g., user, token creation time, backend action, the corresponding parameters for the action). For instance, in the event of an attack, the audit handler 135 may provide for checking which user triggered token creation.

In an implementation, the integrator system 110 may include a configuration user interface (UI) 136 for generating or creating a symmetric key (e.g., the secret HMAC key) for HMAC purposes. The symmetric key may be bound uniquely to the target backend system(s) 140. The integrator system 110 may be enabled to lookup a correct key to build a correct proof (e.g., the multi-system protection token) for each URL to be rendered. These and other aspects are further described herein.

In the example of FIG. 1, the system 100 further comprises the one or more backend systems 140 as one or more other computer systems with each having instructions recorded on another computer-readable storage medium 144 and executable by at least one other processor 142. The backend system(s) 140 may include a token handler 150 configured for validating the multi-system protection token received from the user agent 170. Further, it should be appreciated that each backend system 140 may include any standard element(s) and/or component(s), including the at least one processor(s) 142, memory (e.g., non-transitory computer-readable storage medium) 144, a network interface 146, power, peripherals, and various other computing elements and/or components that may not be specifically shown in FIG. 1. As such, it should be appreciated that various other elements and/or components of each backend system 140 that may be useful to implement each backend system 140 may be added or included, as would be apparent to one of ordinary skill in the art.

In an implementation, each backend system 140 may include the network interface 146 adapted for communication with the network. In various examples, the network interface 146 may comprise a wireless communication component, such as a mobile cellular component, a wireless broadband component, a wireless satellite component, or various other types of wireless communication components including RF, MWF, and/or IRF components adapted for communication with the network. In various other examples, the network interface 146 may be adapted to interface with a DSL modem, a PSTN modem, an Ethernet device, and/or various other types of wired and/or wireless network communication devices adapted for communication with the network.

In an implementation, the token handler 150 of each backend system 140 may include one or more of a local token generator 152, a token validator 154, and a token auditor 156. The local token handler 152 may be configured for processing one or more local XSRF protection tokens received from the user agent 170. The local token handler 152 may be configured as a local XSRF protection mechanism of each backend system(s), operating as a backend server, that may be configured to achieve the functionality of local XSRF protection. The token validator 154 may be configured for validating the one or more local XSRF protection tokens received from the user agent 170, and the token auditor 156 may be configured for auditing the one or more local XSRF protection tokens received from the user agent 170.

In various examples, each backend system(s) 140 may use portal user identification for authentication of a user's account name. This authentication may be used for auditing user calls to ensure that portal users cannot request a token and then use the requested token for attacking another portal user without being detected. Further, each backend system 140 may include a decision handler 158 configured to protect resources and determine whether XSRF protection tokens are valid and needed to process state change calls. Accordingly, as described herein, each backend system(s) may be configured to validate multi-system protection tokens by generating an expected multi-system protection token from the stored secret cryptographic data key (e.g., a digital signature including a public/private key pair) and determining whether the multi-system protection token received from the user agent 170 matches the expected multi-system protection token. These and various other aspects of the disclosure are described herein.

In an implementation, each backend system 140 may include a configuration user interface (UI) 160 configured for importing the secret cryptographic data key, the another computer-readable storage medium 144 configured for storing the imported secret cryptographic data key in a secure manner, and the at least one other processor 142 configured for retrieving the stored secret cryptographic data key from the another computer-readable storage medium 144 under an identity of the integrator system 110. In another implementation, each backend system 140 may be configured to validate the multi-system protection token by generating an expected multi-system protection token from the stored secret cryptographic data key and determining whether the multi-system protection token received from the user agent 170 matches the expected multi-system protection token.

Accordingly, in an example, the (symmetric) key for the HMAC calculation may be created at the integrator system 110, exported there via the integrator configuration UI 136, and imported at the backend system 140 via the backend configuration UI 160. In another example, the (symmetric) key for the HMAC calculation may be created at the backend system 140, exported there via the backend configuration UI 160, and imported at the integrator system 110 via the integrator configuration UI 136.

In the example of FIG. 1, the system 100 further comprises the user agent 170 as another computer system having instructions recorded on another computer-readable storage medium 174 and executable by at least one other processor 172 to perform the function and operations of a browser, including an Internet browser. The user agent 170 may include a request generator 180 configured for providing state change calls to one or more of the backend systems 140 after receiving the multi-system protection token from the integrator system 110. Further, it should be appreciated that the user agent 170 may include any standard element(s) and/or component(s), including the at least one processor(s) 172, memory (e.g., non-transitory computer-readable storage medium) 174, a network interface 176, power, peripherals, and various other computing elements and/or components that may not be specifically shown in FIG. 1. Further, the user agent 170 may include a display device 184 (e.g., a monitor or other display) that may be used to provide a GUI 186, such as a browser including an Internet browser, that may be used, for example, to receive instructions from a user for requesting state change calls for implementing aspects of the disclosure. As such, it should be appreciated that various other elements and/or components of the user agent 170 that may be useful to implement the user agent 170 may be added or included, as would be apparent to one of ordinary skill in the art. These and other aspects of the disclosure are described herein.

In an implementation, the user agent 170 may include the network interface 176 adapted for communication with the network. In various examples, the network interface 176 may comprise a wireless communication component, such as a mobile cellular component, a wireless broadband component, a wireless satellite component, or various other types of wireless communication components including RF, MWF, and/or IRF components adapted for communication with the network. In various other examples, the network interface 176 may be adapted to interface with a DSL modem, a PSTN modem, an Ethernet device, and/or various other types of wired and/or wireless network communication devices adapted for communication with the network.

In an implementation, the browser may be adapted to provide a network interface for user interaction and for browsing information over the network including user identity information provided over the network 160. As such, the browser may be implemented, in part, as a web browser to view, provide, and search various types of information over the network 160. For example, via interaction with the browser, the user is able to access remote server websites of the integrator system 110 and the one or more backend systems 140 over a network to provide user identity information and requests for state change calls via the user agent 170. As such, with browser interaction, the user may conduct network based transactions with the integrator system 110 and the one or more backend systems 140 via the user agent 170.

Therefore, in an aspect of the disclosure, an enterprise portal (e.g., the integrator system 110 as a multi-system portal) may attempt to achieve the functionality of what the local XSRF protection concepts attempts to prohibit including performing among other things (potentially single-shot) state changes to the backend system(s) that originate from the enterprise portal. In an implementation, a task for the enterprise portal, from a backend perspective, is to determine whether the enterprise portal is deemed trustworthy enough to directly perform state-changing calls.

In the example of FIG. 1, it should be appreciated that the multi-system security integration management system 100 is illustrated with the integrator system 110, one or more backend systems 140, and the user agent 170 each using various functional blocks or modules that represent more-or-less discrete functionality. However, such illustration is provided for clarity and convenience, and thus, it should be appreciated that the various functionalities within each example system may overlap or be combined within a described block(s) or module(s), and/or may be implemented by one or more block(s) or module(s) not specifically illustrated within each example system of FIG. 1. Accordingly, it should be appreciated that conventional functionality that may be considered useful to each example system of FIG. 1 may be included as well even though such conventional elements are not illustrated explicitly, for the sake of clarity and convenience.

Figure 2A:
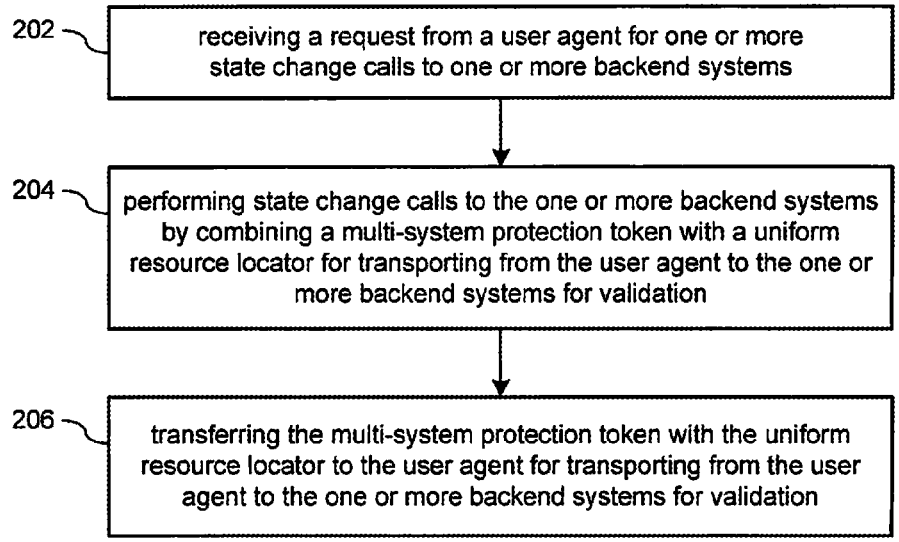
FIG. 2A is a process flow illustrating an example method for managing multi-system security integration, in accordance with aspects of the disclosure.

FIG. 2A is a process flow illustrating an example method 200 for managing multi-system security integration, in accordance with aspects of the disclosure.

In the example of FIG. 2A, operations 202-206 are illustrated as discrete operations occurring in sequential order. However, it should be appreciated that, in other implementations, two or more of the operations 202-206 may occur in a partially or completely overlapping or parallel manner, or in a nested or looped manner, or may occur in a different order than that shown. Further, additional operations, that may not be specifically illustrated in the example of FIG. 2A, may also be included in some implementations, while, in other implementations, one or more of the operations 202-206 may be omitted. Further, the method 200 may include a process flow for a computer-implemented method for managing multi-system security integration in the integrator system 110 of FIG. 1. Further, as described herein, the operations 202-206 may provide a simplified operational process flow that may be enacted by the integrator system 110 to provide features and functionalities as described in reference to FIG. 1.

In an aspect of the disclosure, the method 200 may be provided for enabling a trusted calling system (e.g., the integrator system 110) to build strong claims (e.g., generate the multi-system protection token) and vouch for the originality of these claims that are transferred via an end-user's browser (e.g., the user agent 170) to the one or more backend systems 140 to be integrated. The one or more backend systems 140 may be configured to validate the claims and integrate this central approach with their local XSRF protection solutions already in place.

In the example of FIG. 2A, at 202, the method 200 may include receiving a request from a user agent (e.g., the user agent 170) for one or more state change calls to one or more backend systems (e.g., the one or more backend systems 140).

At 204, the method 200 may include performing state change calls to the one or more backend systems (e.g., the one or more backend systems 140) by combining a multi-system protection token with a uniform resource locator (URL) for transporting from the user agent (e.g., the user agent 170) to the one or more backend systems (e.g., the one or more backend systems 140) for validation. In an implementation, combining the multi-system protection token with the URL may include inserting the multi-system protection token as part of the URL for transporting from the user agent 170 to the one or more backend systems 140 for validation. In an implementation, local protection may be configured to stay in place and may not be deactivated for any time period. However, in another implementation, if a request is received with a valid multi-system XSRF token instead of a local XSRF token, this request may pass the validation and may not be rejected. As such, in an example, the local XSRF protection may not be turned off during a short time interval, and the lifetime of the multi-system XSRF token may be constrained to a short interval since it allows for a state-changing request to be posed to at least one of the backend systems 140 without a valid local token, which may be referred to, for instance, as a door-opener.

At 206, the method 200 may include transferring the multi-system protection token with the URL to the user agent (e.g., the user agent 170) for transporting from the user agent (e.g., the user agent 170) to the one or more backend systems (e.g., the one or more backend systems 140) for validation.

Figure 2B:
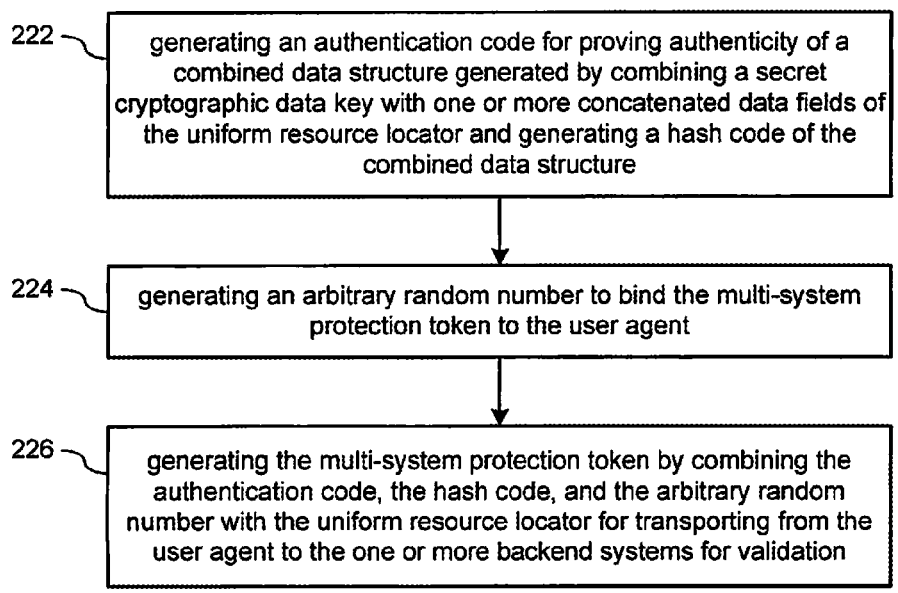
FIG. 2B is another process flow illustrating another example method for managing multi-system security integration, in accordance with aspects of the disclosure.

FIG. 2B is another process flow illustrating another example method 220 for managing multi-system security integration related to the method 200 of FIG. 2A, in accordance with aspects of the disclosure.

In the example of FIG. 2B, operations 222-226 are illustrated as discrete operations occurring in sequential order. However, it should be appreciated that, in other implementations, two or more of the operations 222-226 may occur in a partially or completely overlapping or parallel manner, or in a nested or looped manner, or may occur in a different order than that shown. Further, additional operations, that may not be specifically illustrated in the example of FIG. 2B, may also be included in some implementations, while, in other implementations, one or more of the operations 222-226 may be omitted. Further, the method 220 may include a process flow for a computer-implemented method for managing multi-system security integration in the integrator system 110 of FIG. 1. Further, as described herein, the operations 222-226 may provide a simplified operational process flow that may be enacted by the integrator system 110 to provide features and functionalities as described in reference to FIG. 1.

In an aspect of the disclosure, a example countermeasure against XSRF is a cryptographically strong protection token that may be bound to a logon session (e.g., as described herein) of the user, and may be necessary to exist in requests that attempt to perform calls to modify the server state of backend system(s), such as one or more of the backend systems 140. Each protection concept attempts to prohibit state-changing requests that originated from outside the local system (e.g., as from a potential attacking site). This behavior may be highly undesirable from an integration system point of view.

As such, in an aspect of the disclosure, the method 220 may be provided for rendering of a uniform resource locator (URL) controlled by the enterprise portal to insert proof into the URL that this modified URL was rendered by the enterprise portal for security purposes. In an implementation, this proof may comprise the multi-system protection token that is transported to the backend system(s) via the user agent.

In the example of FIG. 2B, at 222, the method 220 may include generating an authentication code for proving authenticity of a combined data structure generated by combining a secret cryptographic data key with one or more concatenated data fields of the uniform resource locator (URL) and generating a hash code of the combined data structure. In an implementation, as described herein, the authentication code may include a hashed message authentication code (HMAC).

At 224, the method 220 may include generating an arbitrary random number (RN) to bind the multi-system protection token to a user agent (e.g., the user agent 170). In an implementation, the arbitrary random number (RN) may include any type of randomly generated number including a pseudo-random number to bind the multi-system protection token to the user agent 170.

At 226, the method 220 may include creating or generating the multi-system protection token by combining the authentication code and the arbitrary random number (RN) with the URL for transporting from the user agent (e.g., the user agent 170) to one or more backend systems (e.g., the one or more backend systems 140) for validation. As described herein, the authentication code may comprise a hashed message authentication code (HMAC). Further, as described herein, the multi-system protection token may comprise a multi-system XSRF token that may be configured to disable local XSRF protection of the one or more backend systems 140 for performing the state change calls during a short time interval.

In an implementation, the method 220 may include generating parameter information comprising any type of data sent as part of the request to the target backend that may be needed for fulfilling the request including, for example, one or more HTTP codes associated with the URL, such as, for example, an OK code, a GET code, and/or a POST code, wherein generating the multi-system protection token may include combining the parameter information, the authentication code, and the arbitrary random number with the uniform resource locator.

In an implementation, the multi-system protection token may be bound to the transaction about to take place in the target backend (e.g., respectively, the state change that occurs in the target backend). With use of HMAC for authenticity and integrity, the validation side at the backend may need to know which parameters went into the HMAC generation. Different mechanisms may be used to achieve this. For example, signaling of parameters to the backend (e.g., introducing an XML structure that denotes specific parameters in a specific order are to be used for the HMAC validation). In another example, canonicalization of parameters (e.g., a well-defined order of all parameters and/or all parameter names and values in lower-case). In another example, out of band signaling of a subset of parameters (e.g., agreement via configuration of integrator system and backend system).

In an implementation, the method 220 may include generating a timestamp including an expiration timestamp, such as an expiration UTC timestamp, that may be valid only during a short time interval including within a range of greater than zero minutes and less than five minutes, wherein generating the multi-system protection token may include combining the expiration timestamp, the authentication code, and the arbitrary random number with the uniform resource locator.

In an implementation, the method 220 may include using the computer-readable medium 114 for storing the secret cryptographic data key in a secure manner, and using the at least one processor 112 for retrieving the stored secret cryptographic data key from the computer-readable medium 114 for generating the authentication code.

In an implementation, the combination of the multi-system protection token with the URL is provided for transporting from the user agent (e.g., the user agent 170) to the one or more backend systems (e.g., the one or more backend systems 140) for validation. As such, the method 220 may be used by the integrator system 110 to perform state change calls to one or more backend systems (e.g., the one or more backend systems 140), as provided at 204 of method 200 in FIG. 2A.

Figure 3A:
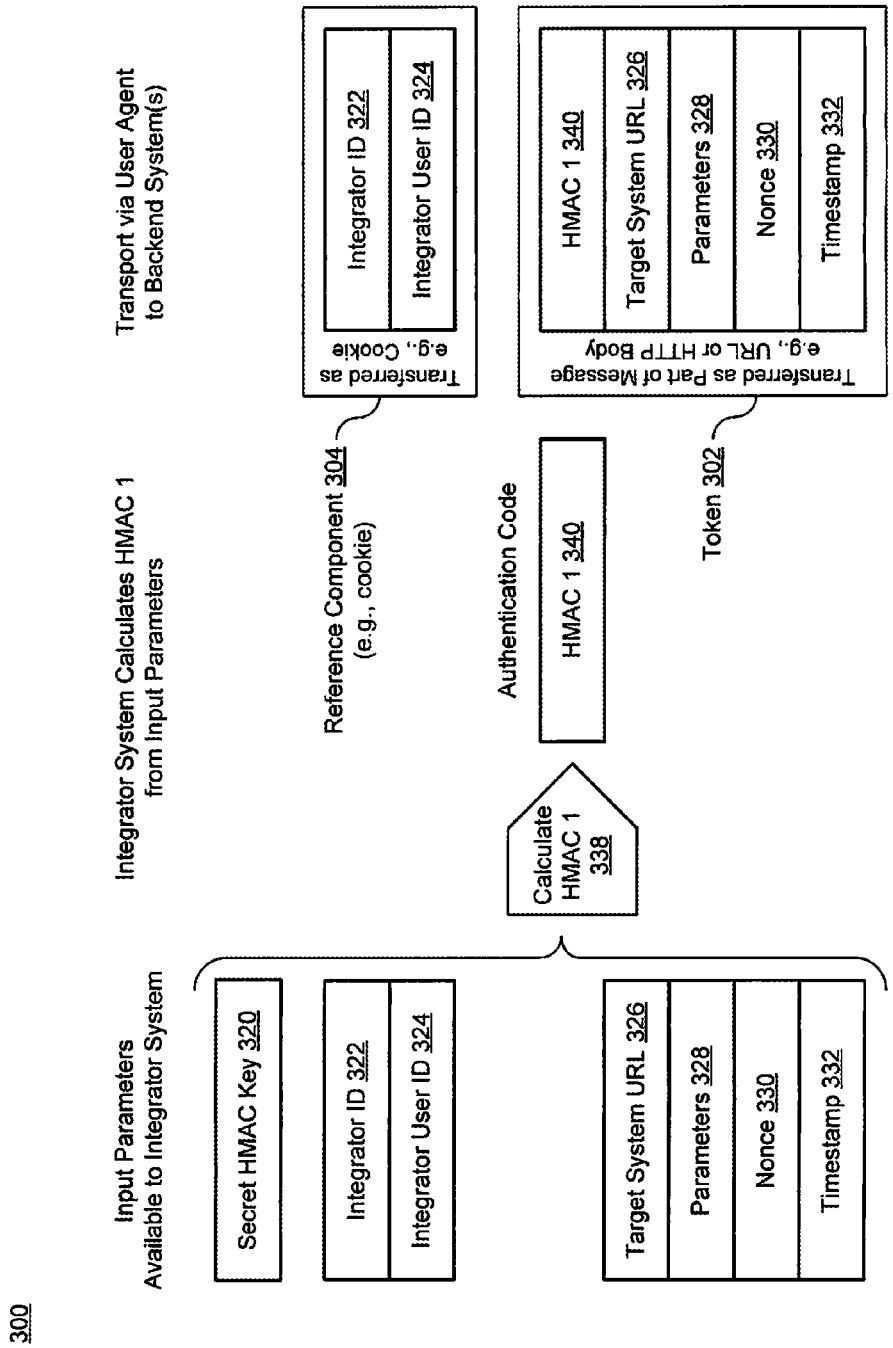
FIGS. 3A-3B are various block diagrams illustrating an example transfer mechanism that describes data elements of a multi-system protection token and transfer thereof, in accordance with aspects of the disclosure.
Figure 3B:
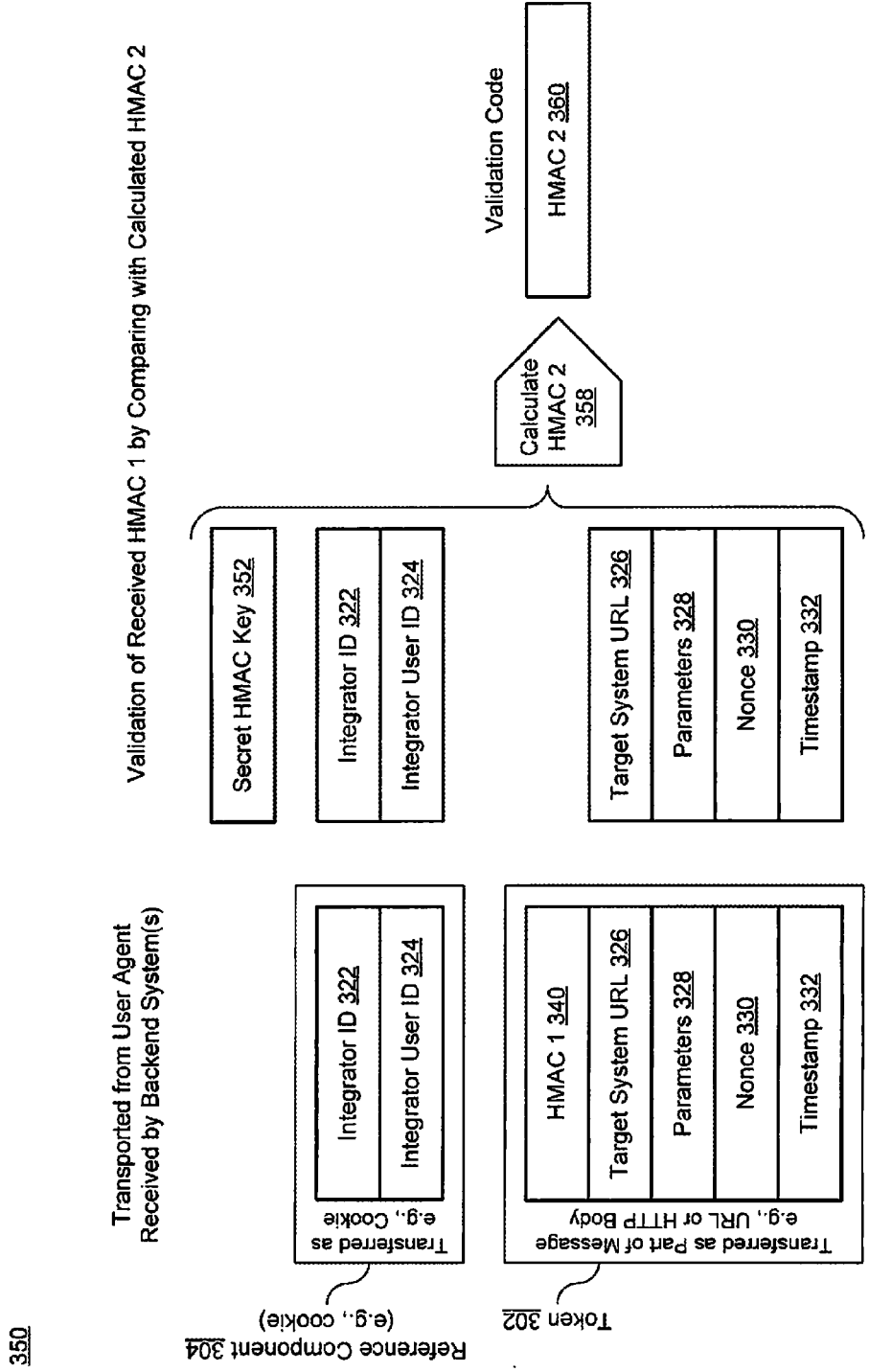

FIGS. 3A-3B are various block diagrams illustrating an example transfer mechanism that describes data elements of the multi-system protection token and the transfer thereof, in accordance with aspects of the disclosure. In particular, FIG. 3A shows an example of the transfer mechanism for using one or more input parameters to calculate an authentication code, combining the one or more input parameters with the calculated authentication code to generate a multi-system token, and transporting the multi-system protection to one or more backend systems via a user agent. FIG. 3B shows another example of the transfer mechanism for receiving the multi-system protection by the one or more backend systems, using the one or more received input parameters in the multi-system protection token to calculate a validation code, and validating the multi-system protection token by generating an expected multi-system protection token and by determining whether the multi-system protection token received from the user agent matches the expected multi-system protection token.

In an implementation, the integrator system 110 (e.g., an enterprise portal or a multi-system portal) may be configured for valid integration scenarios that may trigger a state change in the one or more backend systems 140 (e.g., an ABAP backend system) directly without an additional intermediary page that attempts to obtain consent of a user to protect against XSRF. It should be appreciated that although an enterprise portal and an ABAP backend system are mentioned as embodiments, the following approach may be considered for use with XSRF protection from any one sending system (as an integrator or integrator system) and multiple receiving systems.

In an implementation, a countermeasure against XSRF may include a cryptographically strong protection token that may be bound to a logon session of the user, and that may be necessary to exist in requests that attempt to modify a server state of the one or more backend systems 140 (e.g., an ABAP backend system).

In an implementation, the multi-system protection token may be created or generated after authentication. The multi-system protection token may be obtained by framework coding in the server system (e.g., at least one of the one or more backend systems 140, such as an ABAP backend system) after authentication within uncritical requests. For example, a business server page (BSP) page may be flagged as a start page, and the framework coding may insert the multi-system protection token into a hypertext markup language (HTML) page to be rendered as a result to the initial request to ensure that follow-up requests (that may then be critical or state-changing) include the multi-system protection token.

In an implementation, a local XSRF protection mechanism of a server system attempts to prohibit state-changing requests that originated from an outside the local system that may be from a potential attacking site. As such, the integrator system 110 (e.g., an enterprise portal or a multi-system portal) may be configured to achieve the functionality of what the local XSRF protection concept attempts to prohibit, such as performing state changes to the one or more backend systems 140 (including, for example, a potentially single-shot state change) that originate from the integrator system 110. Therefore, from a backend perspective, the integrator system 110 should be deemed trustworthy enough to directly perform state-changing calls.

In an implementation, the multi-system protection token may be referred to as a multi-system XSRF token. The rendering of the uniform resource locator (URL) may be controlled by the integrator system 110 to insert proof, such as the multi-system protection token, into the URL, wherein this modified URL may be rendered by the integrator system 110. This proof (i.e., multi-system protection token) may then be transported via the user agent 170 to at least one of the one or more backend systems 140 for validation.

In an implementation, the proof (i.e., multi-system protection token) to be combined with the URL may be adapted to fulfill the following criteria. For instance, in reference to authenticity criteria, the proof (i.e., the multi-system protection token) may be configured to prove to the backend system 140 that the state change request originated from a trustworthy portal (e.g., the integrator system 110 as the calling system). In reference to integrity-protection criteria, any manipulations of the proof should be detectable by the backend system 140. In reference to target system and application constrained criteria, the proof should be bound to a single URL including any related HTTP parameters (e.g., OK code and GET/POST parameters) to ensure that the proof is not reused in a different context. In reference to authenticated user criteria, the proof should be issued only to an authenticated user. For example, an anonymous user should not gain hold of a token that may be used to circumvent the local XSRF protection of the backend system 140. In reference to user-bound or user-binding criteria, the proof should be bound to the portal user to deny any XSRF attack from an illegitimate user. In reference to lifetime-constrained criteria, the proof should only be valid for a short time interval including within a range of greater than zero minutes and less than five minutes, such as, for example, 2 minutes. In reference to one-time-use criteria, the backend system 140 should remember accepted proof tokens and reject any previously accepted proof tokens for any subsequent requests.

In reference to the example of FIG. 3A, the integrator system 110 may be configured to generate or calculate 338 the authentication code 340 (e.g., HMAC 1) from the one or more input parameters as part of the multi-system protection token 302 for transporting to the one or more backend systems 140 via the user agent 170. In an implementation, to fulfill the authenticity and integrity criteria, the proof (i.e., multi-system protection token 302, such as a multi-system XSRF token) may be protected with a symmetric mechanism, such as, for example, a hashed message authentication code 340 (e.g., HMAC 1), which comprises a mechanism configured for proving the authenticity of a statement (e.g., combined data structure) by appending a secret cryptographic key (e.g., secret HMAC key 320) to one or more concatenated data fields of the target system uniform resource locator (URL) 326 and producing a hash of this combined data structure. For instance, in an implementation, once this combined data structure with the hash is received, the owner of the secret HMAC key 320 may check whether the combined data structure has been unchanged. Since the HMAC binds more information into the multi-system protection token 302, any changes to the token 302 may be easily detected due to the secrecy of the secret HMAC key 320. In an example, to validate the token 302, the parameters used to generate the token 302 should be available at the validating system, which is further described herein.

In another implementation, to fulfill the authenticity and integrity criteria, the proof (i.e., multi-system protection token 302, such as a multi-system XSRF token) may be protected with an asymmetric mechanism, such as, for example, a digital signature (e.g., a public/private key pair), which comprises another mechanism configured for proving the authenticity of a statement (e.g., combined data structure).

As such, in an implementation, the HMAC refers to a mechanism to obtain authenticity and integrity of the multi-system protection token, which refers to two security properties that are desirable for protection. It should be appreciated by those skilled in the art that one or more other mechanisms besides HMAC may be used. For instance, a digital signature may be implemented by using asymmetric cryptography instead of the symmetric cryptography used for HMAC.

In reference to the example of FIG. 3A, the one or more input parameters that may be available to the integrator system 110 for generating or calculating 338 the authentication code 340 (e.g., HMAC 1) may include one or more of the secret HMAC key 320, a caller identification (ID) 322 (e.g., an integrator ID, a system identifier (SID), and/or client identifier), an integrator user identifier (ID) 324 (e.g., a portal user identifier (ID)), the target system URL 326, one or more parameters 328 (e.g., one or more HTTP parameters including OK code, GET code, and/or POST code), a nonce 330 (e.g., an arbitrary random number (RN)), and a timestamp 332 (e.g., an expiration UTC timestamp). In an example, the secret cryptographic data key may include a digital signature including a public/private key pair.

In reference to the calling system (e.g., the integrator system 110 being identified with the portal SID and client 322), while the calculated authentication code 340 (e.g., HMAC 1) provides authenticity to a degree, the authentication code 340 (e.g., HMAC 1) may only serve to prove that the signer knew the secret HMAC key 320. As such, mechanisms may be included to ensure that the secret HMAC key 320 is known only by the integrator system 110 and the corresponding backend system(s) 140 receiving the multi-system protection token 302. To lookup the key, the token 302 (which may be referred to as a message, in some examples) needs to provide some key identifier or system identifier for the calling system. As such, the portal SID and client 322 may serve this purpose to identify the integrator system 110.

In an implementation, the parameters 328 may include one or more of uniform resource identifier (URI), HTTP parameters including OK code, GET code, and/or POST code to properly bind the proof (i.e., the multi-system protection token 302) to the context that it is about to be used in. As such, the target system URL 326, and the GET and POST parameters incl. OK code 328 may be included in the multi-system protection token 302 as part of the proof.

In an implementation, the integrator user ID 324 and nonce 330 may be used to bind the proof (i.e., the multi-system protection token 302) to the user in whose name the call may be made, and to ensure the freshness of the multi-system protection token 302, the integrator user ID 324 and the nonce 330 may be used as part of the proof. In an example, the backend system(s) 140 may not make much use of the integrator user ID 324, since that user's account name at the target backend system(s) 140 may be different from the portal user name. Nevertheless, this may be used for auditability since it may ensure that a first portal user cannot request a token and then use the requested token for attacking another portal user without being detected.

In an implementation, referring to the timestamp 332 (e.g., an expiration UTC timestamp), the proof (i.e., the multi-system protection token 302) may be valid only during a short time interval, such as, for example, including within a range of greater than zero minutes and less than five minutes, such as, for example, 2 minutes. However, it should be appreciated by those skilled in the art that any amount of time or any related time interval including any time greater than, less than, or equal to five minutes may be used without departing from the scope of the disclosure.

In reference to data transfer, due to limits in a supported URL length, the amount of data elements may not be insignificant. For instance, to circumvent this possible problem, a decision may be made on the parts for transfer as part of the URL, as part of the HTTP body, and/or as part of a specific reference component 304, such as specific cookie, that may be set on a common domain. As such, in an example, the reference component 304 (e.g., cookie) may be transferred with each request and may be reused, whereas the URL and/or HTTP body may be call-specific. It should be appreciated that a cookie is an example of the reference component 304, and in other examples, the reference component 304 may include a HTTP header or a POST parameter in the HTTP body, wherein data may be transferred in the HTTP header or in the POST parameter in the HTTP body.

In an implementation of the multi-system protection token 302, as shown in FIG. 3A, data elements that may be provided in the URL and/or HTTP body may include one or more of the calculated authentication code 340 (i.e., HMAC 1), the target system URL 326, the parameters 328 (including, e.g., the OK code), the nonce 330 (e.g., an arbitrary RN), and the timestamp 332 (e.g., an expiration UTC timestamp). Further in an implementation, 2, as shown in FIG. 3A, data elements that may be provided in the related reference component 304 (e.g., cookie) may include one or more of the caller or calling system ID 322 (e.g., a portal SID and/or client) and the integrator user ID 324).

As shown in reference to FIGS. 3A-3B, one data element (i.e., the secret HMAC key 320) of the proof is not transferred from the integrator system 110 via the user agent 170 to the backend system(s) 140. In an aspect of the disclosure, the secret HMAC key 320 must be known only to the sending system (i.e., the integrator system 110) and the called system (i.e., the receiving backend system(s) 140), and the secret HMAC key must be exchanged once between each of these systems 110, 140 via out-of-band means. As such, the integrator system 110 stores the secret HMAC key 320 in local memory, such as in the computer-readable storage medium 114, for generating or calculating 338 the authentication code 340 (e.g., HMAC 1), and the backend system(s) 140 stores another same secret HMAC key 352 in local memory, such as in the computer-readable storage medium 144, for generating or calculating 358 a validation code 360 (e.g., HMAC 2). As such, in an implementation, the integrator system 110 may be configured to generate or calculate 338 the authentication code 340 (e.g., HMAC 1) from the secret HMAC key 320 and the one or more input parameters and combine as part of the multi-system protection token 302 and/or the reference component 304 (e.g., cookie) for transporting to the one or more backend systems 140 via the user agent 170, and the backend system(s) 140 may be configured to receive the multi-system protection token 302 and/or the reference component 304 (e.g., cookie) from the integrator system 110 via the user agent 170 for generating or calculating 358 the validation code 360 (e.g., HMAC 2) from the locally stored secret KMAC key 352 and the one or more input parameters received as part of the received multi-system protection token 302 and/or the reference component 304 (e.g., cookie).

In an implementation, referring to FIG. 1, the integrator system 110 may include the configuration user interface (UI) 136 for generating or creating a symmetric key (e.g., the secret HMAC key 320) for HMAC purposes. The symmetric key may be bound uniquely to the target backend system, for example, by specifying for an AS ABAP backend, the SID, ABAP client, and host+domain. The integrator system 110 may be enabled to lookup a correct key, for example, to build a correct proof for each URL to be rendered.

In an implementation, the backend system (e.g., such as an AS ABAP backend and each other backend to be enriched with the multi-system XSRF protection) may be configured with the configuration UI 136 for importing a secret HMAC key, store the imported secret HMAC key in a secure manner, and providing lookup functionality under an identity of the calling portal, such as the integrator system 110. The configuration UI 136 may be accessible only by an administrative user of the system, and strong channel encryption may be employed to protect the exchange of the secret HMAC key. The lifetime of the secret HMAC key may be configurable and a new secret HMAC key may be generated or calculated before the lifetime of the previous secret HMAC key has passed to allow a timely switch. Lifecycle management of secret HMAC keys may be implemented by the integrator system 110 for further protection and security.

Figure 4:
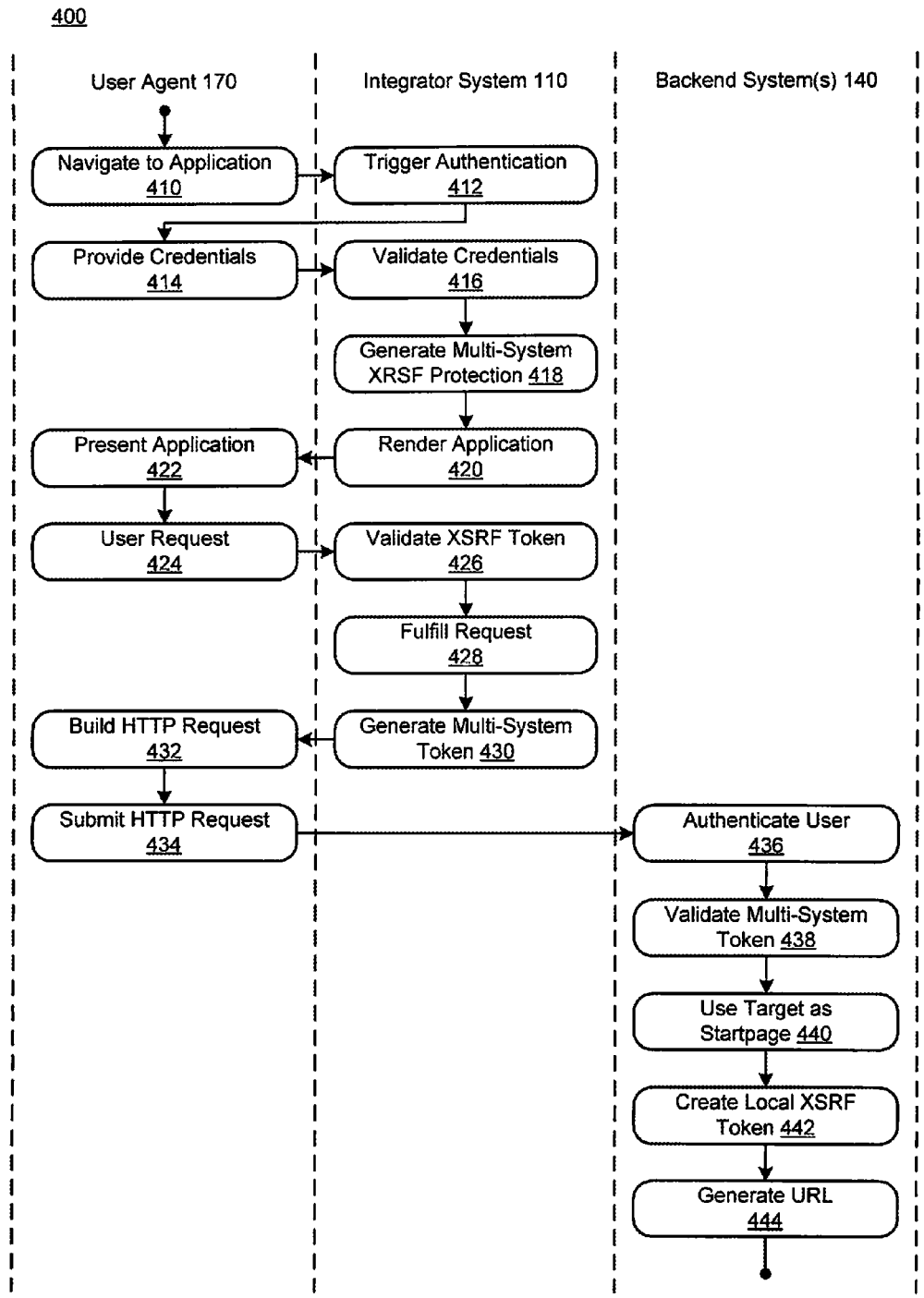
FIG. 4 is an example activity diagram illustrating interactions between a user agent, an integrator system, and one or more backend systems to achieve multi-system XSRF protection, in accordance with aspects of the disclosure.

FIG. 4 is an example activity diagram illustrating interactions 400 between the user agent 170 (e.g., a browser of the user agent 170), the integrator system 110 (e.g., an enterprise portal), and the one or more backend systems 140 (e.g., one or more ABAP backend systems) to achieve multi-system XSRF protection, in accordance with aspects of the disclosure. For example, FIG. 4 shows a simplified runtime view including relevant activities that may be performed at a calling system (e.g., the integrator system 110) and the called backend system (e.g., the one or more backend systems 140).

In an implementation, the integrator system 110 may comprise a caller or calling system configured for activities including relevant preconditions related to generating the multi-system protection token, which may be referred to as a multi-system XSRF token. The local XSRF protection mechanism of the calling system may be initialized and already in protected mode, wherein a local token may have been validated at least once already. This may explicitly mean that the calling system may not generate, create, or render any URLs to the target system(s) using the multi-system XSRF protection mechanism before validating the local XSRF protection token at least once. For example, if this precondition were not fulfilled, an attacker may direct an attack on this startpage having the functionality to render external URLs, and the multi-system XSRF protection mechanism of the integrator system 110 may vouch to the targeted backend system(s) that the actions behind the URLs may be safely executed, which may not be the case.

In reference to the example of FIG. 4, the user agent 170 may navigate to an application 410 by selecting, for instance, a integrator system link to navigate to an application startpage. The user agent 170 may trigger authentication 412 at the integrator system 110. The integrator system 110 may request the user agent 170 to provide credentials 414 (e.g., username and password), and the integrator system 110 may validate the credentials 416 provided by the user agent 170. If validated, the integrator system 110 may be configured to generate a local XRSF protection 418, and the integrator system 110 may render the application 420 and present the rendered application 422 to the user agent 170. The user agent 170 may provide a state-changing request 424 with a local XSRF protection token to the integrator system 110. The integrator system 110 may validate the local XSRF protection token 426. After the local XSRF token is validated successfully, the local XSRF protection solution is in a protected mode. In this example, the state change may be triggered in the backend to create or generate a multi-system protection token. If a state change is triggered locally without backend involvement, then a local protection solution may be sufficient.

The integrator system 110 may fulfill the request 428 by creating or generating the multi-system protection token 430 for transporting to the backend system 140 via the user agent 170. The user agent 170 may build a resulting HTTP request 432 with the multi-system protection token and submit the HTTP request 434 with the multi-system protection token to the backend system 140. At this point, the backend system 140 may receive the HTTP request, authenticate 436 the user agent 170, validate the multi-system protection token 438, and use the target as a startpage 440. The backend system 140 may create or generate a local XSRF protection token 442 and render the local XSRF protection token in a result page for this request.

Further, the backend system 140 may create or generate a uniform resource locator (URL) 444. For example, in an implementation, a URL generation feature of the integrator system 110 may be enriched with a proof generation feature, which may be configured to look up the secret HMAC key 320 for each target backend system 140 and generate the proof as provided in FIGS. 3A-3B.

In an implementation, the one or more data elements that serve as input parameters to the HMAC function may be transported via a browser of the user agent 170 to the target backend system(s) 140, with the exception of the secret HMAC key that is exchanged out-of-band). To cope with a limited URL length, part of the content (that is not request-specific, but only target-system-specific) may be transferred as part of the reference component 304 (e.g., a cookie), wherein a name of the cookie may include a reference to the caller or calling system (e.g., the integrator system 110). For instance, in case of an enterprise portal (SID: ME1, Client: 000), the cookie may be named or referred to as, for example, START_ME1__000, the cookie may be set on a common domain between the calling system and the called system. In an implementation, the cookie does not need particular integrity protection, since the HMAC calculation already covers the cookie content. Within the proof generation feature, the integrator system 110 may need to check whether the cookie with said identifier is already available and includes the correct information. If the conditions are not met, the cookie may need to be created or recreated. It should be appreciated that a cookie is an example of the reference component 304, and thus, in other examples, the reference component 304 may include a HTTP header or a POST parameter in the HTTP body, wherein data may be transferred in the HTTP header or in the POST parameter in the HTTP body.

In an implementation, referring to FIGS. 3A-3B, the called system (e.g., the backend system 140) may need to authenticate the user agent 170 that attempts to perform a state-changing call including a deep state-changing call. In this instance, processing may only continue after successful authentication. In an example, validation of the multi-system protection token 302 may include one or more operations. For instance, the called system is configured to confirm whether the calling system (e.g., caller SID and/or client 322) is a trusted system for the multi-system XSRF protection. In another instance, the called system is configured to confirm whether the timestamp 322 has expired. In another instance, the called system is configured to confirm whether the authentication code (e.g., HMAC 1) is correct. In another instance, the called system is configured to confirm whether the multi-system protection token 302 has been processed.

In an implementation, a one-time-use policy may be in place to ensure that the multi-system protection token 302 is only used once. For instance, this may be realized by storing all proof parameters and ranging up this storage regularly to remove entries whose expiration timestamp has passed. By implementing a one-time-use policy, the window for an attack may be fairly small (e.g., 2 minutes), and the remaining mechanisms (e.g., the reference component 304 (e.g., cookie), a username and password combination, etc.) may be sufficient to prevent attacks. One time use policy and time restriction are two independent protection mechanisms. As such, the time restriction limits the attack window.

In an implementation, if operations have been performed successfully, the validation of the multi-system protection token 302 may be considered successful. The called backend system 140 may thus know that this URL originated from a trustworthy portal (e.g., the integrator system 110 configured as an enterprise portal or a multi-system portal), which itself may have local XSRF protection in place. As such, the called backend system 140 may process the state-changing request.

In an implementation, processing the state-changing request correctly may refer to a backend system having an integrated local XSRF protection mechanism. The backend system may need to act as if a local XSRF protection token were received as part of the state-changing call. Therefore, the local XSRF protection token may need to be created, and the result page from this initial state-changing call may need to include the local XSRF protection token, just as if this was part of a regular interaction (i.e., which originated from a local startpage).

In various implementations, an extensible solution may be used to remote start any XSRF protected resource in any backend system, wherein the multi-system XSRF token approach may be used for each local XSRF protection mechanism in a secure way. In an example, the multi-system XSRF token originating in the calling system may be tightly bound to a backend system to transition securely to a local XSRF protection mechanism.

Figure 5A:
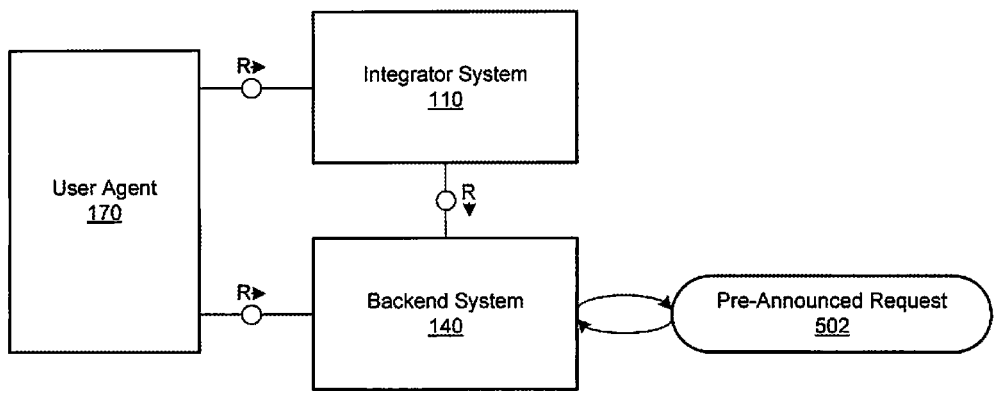
FIG. 5A is a block diagram illustrating another example system for managing multi-system security integration, in accordance with aspects of the disclosure.

FIG. 5A is a block diagram illustrating another example system 500 for managing multi-system security integration, in accordance with aspects of the disclosure.

Figure 5B:
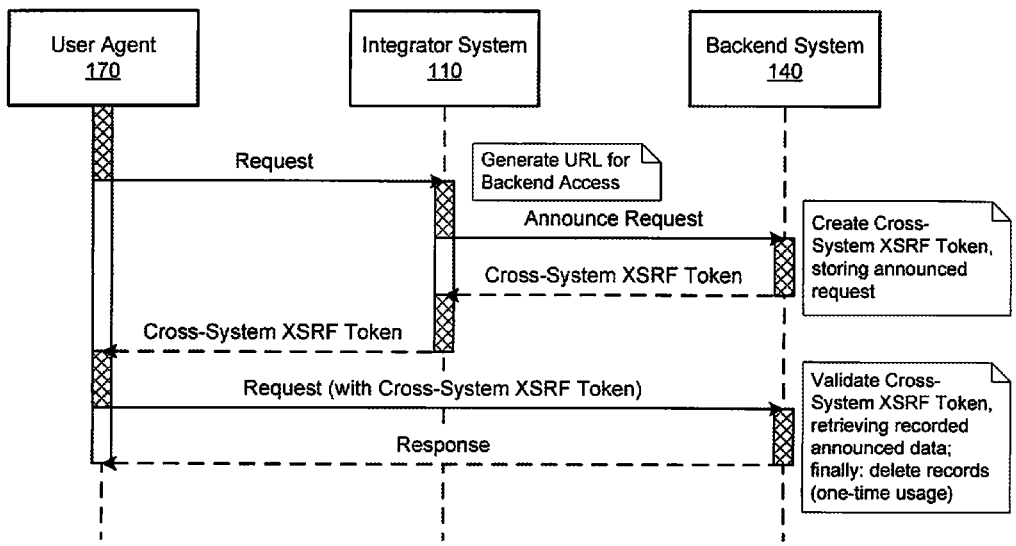
FIG. 5B is another example activity diagram illustrating interactions between the user agent, the integrator system, and one or more backend systems to achieve multi-system XSRF protection, in accordance with aspects of the disclosure.

FIG. 5B is an example activity diagram illustrating interactions 550 between the user agent 170 (e.g., a browser of the user agent 170), the integrator system 110 (e.g., an enterprise portal), and the one or more backend systems 140 (e.g., one or more ABAP backend systems) to achieve multi-system XSRF protection, in accordance with aspects of the disclosure. For example, FIG. 5B shows a simplified runtime view including relevant activities that may be performed at a calling system (e.g., the integrator system 110) and the called backend system (e.g., the one or more backend systems 140).

The examples of FIGS. 5A-5B describes an approach that is based on the ability of the integrator system 110 to directly submit requests to the backend system 140, for example, via back-channel communication. In some instances, such back-channel communication may not be possible or desired (e.g., when the systems are operated by different organizational units). This option may be a solution in scenarios where back-channel communication is possible, since this approach has some advantages.

For example, this option may provide a reduced load on a front-channel (less data needs to be transmitted between user agent and backend system). In another example, this option may provide a one-time usage constraint that may be implemented with less effort. In still another example, this option may provide request parameters that may not need to be canonicalized (e.g., since no hash values need to be calculated).

In reference to the examples of FIGS. 5A-5B, when the integrator system 110 (e.g., an enterprise portal server) is receiving a request to generate a URL (targeting the backend system 140) comprising various access parameters, the integrator system 110 may first notify the backend system 140 in advance, prior to returning the requested navigation link to the user agent 170.

Further, in reference to the example of FIGS. 5A-5B, the backend system 140 may create a cross-system XSRF token and store a pre-announced request data 502 (e.g., including all access parameters) with reference the cross-system XSRF token. In addition, an expiration timestamp may be persisted (e.g., to enable automated "house-keeping" cleanup actions for tokens that have not been utilized). In an implementation, the integrator system 110 may then only need to return the cross-system XSRF token along with the generated backend URL (but without the access parameters) to the user agent 170. With a subsequent request, the user agent 170 may then provide the cross-system XSRF token to the backend system 140 (which has created that token) where it may be validated. Upon successful token validation, the recorded access parameters may be retrieved, and the data record may be deleted (one-time usage). Further, a local XSRF token may be created to enable subsequent requests to the same resource, for example, in a manner as described herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a computer-readable medium and executable by at least one processor, the system comprising:

a multi-system manager configured to cause the at least one processor to perform state change calls to one or more backend systems by combining a multi-system protection token with a message component for transporting from a user agent to the one or more backend systems for validation, wherein the multi-system manager includes:
  a symbol generator configured to generate an authentication code for proving authenticity of a combined data structure generated by combining a secret cryptographic data key with a portion of the message component and generating a hash code of the combined data structure;
  a nonce generator configured to generate an arbitrary random number to bind the multi-system protection token to the user agent; and
  a token generator configured to generate the multi-system protection token by combining the authentication code and the arbitrary random number with the message component for transporting from the user agent to the one or more backend systems for validation.

2. The system of claim 1, wherein combining the multi-system protection token with the message component comprises inserting the multi-system protection token as part of a uniform resource locator or a message body for transporting from the user agent to the one or more backend systems for validation.

3. The system of claim 1, wherein combining the secret cryptographic data key with the portion of the message component includes combining the secret cryptographic data key with one or more concatenated data fields of a uniform resource locator or a part of the message body.

4. The system of claim 1, wherein the multi-system protection token comprises a multi-system local cross-site request forgery (XSRF) token for performing the state change calls during a short time interval.

5. The system of claim 1, wherein the symbol generator comprises a hashed message authentication code (HMAC) generator, and wherein the authentication code comprises at least one of an HMAC and a digital signature including a public/private key pair.

6. The system of claim 1, wherein the nonce generator comprises a random number generator configured to generate the arbitrary random number to bind the multi-system protection token to the user agent.

7. The system of claim 1, further comprising:
an identity generator configured to generate a system identifier (SID) for identifying the computer system and for looking up the secret cryptographic data key by the one or more backend systems,
wherein the token generator is further configured to generate the multi-system protection token by combining the system identifier (SID), the authentication code, and the arbitrary random number with the uniform resource locator, and
wherein the secret cryptographic data key comprises a digital signature including a public/private key pair.

8. The system of claim 1, further comprising:
a parameter generator configured to generate parameter information comprising one or more hypertext transfer protocol (HTTP) codes associated with the message component including an OK code, a GET code, and a POST code,
wherein the token generator is further configured to generate the multi-system protection token by combining the parameter information, the authentication code, and the arbitrary random number with the uniform resource locator.

9. The system of claim 1, further comprising:
a timestamp generator configured to generate an expiration timestamp that is valid only during a short time interval including within a range of greater than zero minutes and less than five minutes,
wherein the token generator is further configured to generate the multi-system protection token by combining the expiration timestamp, the authentication code, and the arbitrary random number with the uniform resource locator.

10. The system of claim 1, wherein the computer-readable medium is configured for storing the secret cryptographic data key in a secure manner, and the at least one processor is configured for retrieving the stored secret cryptographic data key from the computer-readable medium for generating the authentication code by the symbol generator.

11. The system of claim 1, wherein at least one of the one or more backend systems comprises a configuration user interface (UI) configured for importing the secret cryptographic data key, another computer-readable medium configured for storing the imported secret cryptographic data key in a secure manner, and at least one other processor configured for retrieving the stored secret cryptographic data key from the another computer-readable medium under an identity of the computer system.

12. The system of claim 10, wherein the at least one of the one or more backend systems is configured to validate the multi-system protection token by generating an expected multi-system protection token from the stored secret cryptographic data key and determining whether the multi-system protection token received from the user agent matches the expected multi-system protection token.

13. The system of claim 1, wherein the computer system is configured to operate as an integration server and at least one of the one or more backend systems is configured to operate as a backend server to achieve multi-system cross-site request forgery (XSRF) protection when the user agent attempts to perform the state change calls.

14. A computer-implemented method, comprising:
performing state change calls to one or more backend systems by combining a multi-system protection token with a message component for transporting from a user agent to the one or more backend systems for validation by:
generating an authentication code for proving authenticity of a combined data structure generated by combining a secret cryptographic data key with a portion of the message component and generating a hash code of the combined data structure;
generating an arbitrary random number to bind the multi-system protection token to the user agent; and
generating the multi-system protection token by combining the authentication code and the arbitrary random number with the message component for transporting from the user agent to the one or more backend systems for validation.

15. The method of claim 14, wherein combining the multi-system protection token with the message component comprises inserting the multi-system protection token as part of a uniform resource locator or a message body for transporting from the user agent to the one or more backend systems for validation.

16. The method of claim 14, wherein combining the secret cryptographic data key with the portion of the message component includes combining the secret cryptographic data key with one or more concatenated data fields of a uniform resource locator or a part of the message body.

17. The method of claim 14, wherein the multi-system protection token comprises a multi-system local cross-site request forgery (XSRF) token that is configured to disable local XSRF protection of the one or more backend systems for performing the state change calls during a short time interval.

18. The method of claim 14, wherein the authentication code comprises a hashed message authentication code (HMAC).

19. The method of claim 14, further comprising:
generating a system identifier (SID) for identifying the computer system and for looking up the secret cryptographic data key by the one or more backend systems; generating parameter information comprising one or more hypertext transfer protocol (HTTP) codes associated with the message component including an OK code, a GET code, and a POST code; and generating an expiration timestamp that is valid only during a short time interval including within a range of greater than zero minutes and less than five minutes, wherein the multi-system protection token is generated by combining one or more of the system identifier (SID), the parameter information, the expiration timestamp along with the authentication code and the arbitrary random number and with the uniform resource locator.

20. A computer program product, the computer program product being tangibly embodied on a computer-readable storage medium and comprising instructions that, when executed by at least one processor, are configured to:
perform state change calls to one or more backend systems by combining a multi-system protection token with a message component for transporting from a user agent to the one or more backend systems for validation, wherein the instructions, when executed by the at least one processor, are further configured to:
generate an authentication code for proving authenticity of a combined data structure generated by combining a secret cryptographic data key with a portion of the message component and generating a hash code of the combined data structure;
generate an arbitrary random number to bind the multi-system protection token to the user agent; and
generate the multi-system protection token by combining the authentication code and the arbitrary random number with the message component for transporting from the user agent to the one or more backend systems for validation.

21. The computer program product of claim 20, wherein combining the multi-system protection token with the message component comprises inserting the multi-system protection token as part of a uniform resource locator or a message body for transporting from the user agent to the one or more backend systems for validation.

22. The computer program product of claim 20, wherein combining the secret cryptographic data key with the portion of the message component includes combining the secret cryptographic data key with one or more concatenated data fields of a uniform resource locator or a part of the message body.

23. The computer program product of claim 20, wherein the multi-system protection token comprises a multi-system local cross-site request forgery (XSRF) token that is configured to disable local XSRF protection of the one or more backend systems for performing the state change calls during a short time interval.

24. The computer program product of claim 20, wherein the authentication code comprises a hashed message authentication code (HMAC).

25. The computer program product of claim 20, further comprising instructions that, when executed by the processor, are configured to: generate a system identifier (SID) for the computer system to ensure that the secret cryptographic data key is known only by the computer system and the one or more backend systems; generate parameter information comprising one or more hypertext transfer protocol (HTTP) codes associated with the message component including an OK code, a GET code, and a POST code; and generate an expiration timestamp that is valid only during a short time interval including within a range of greater than zero minutes and less than five minutes, wherein the multi-system protection token is generated by combining one or more of the system identifier (SID), the parameter information, the expiration timestamp along with the authentication code and the arbitrary random number and with the uniform resource locator.

* * * * *